Patented Feb. 10, 1948

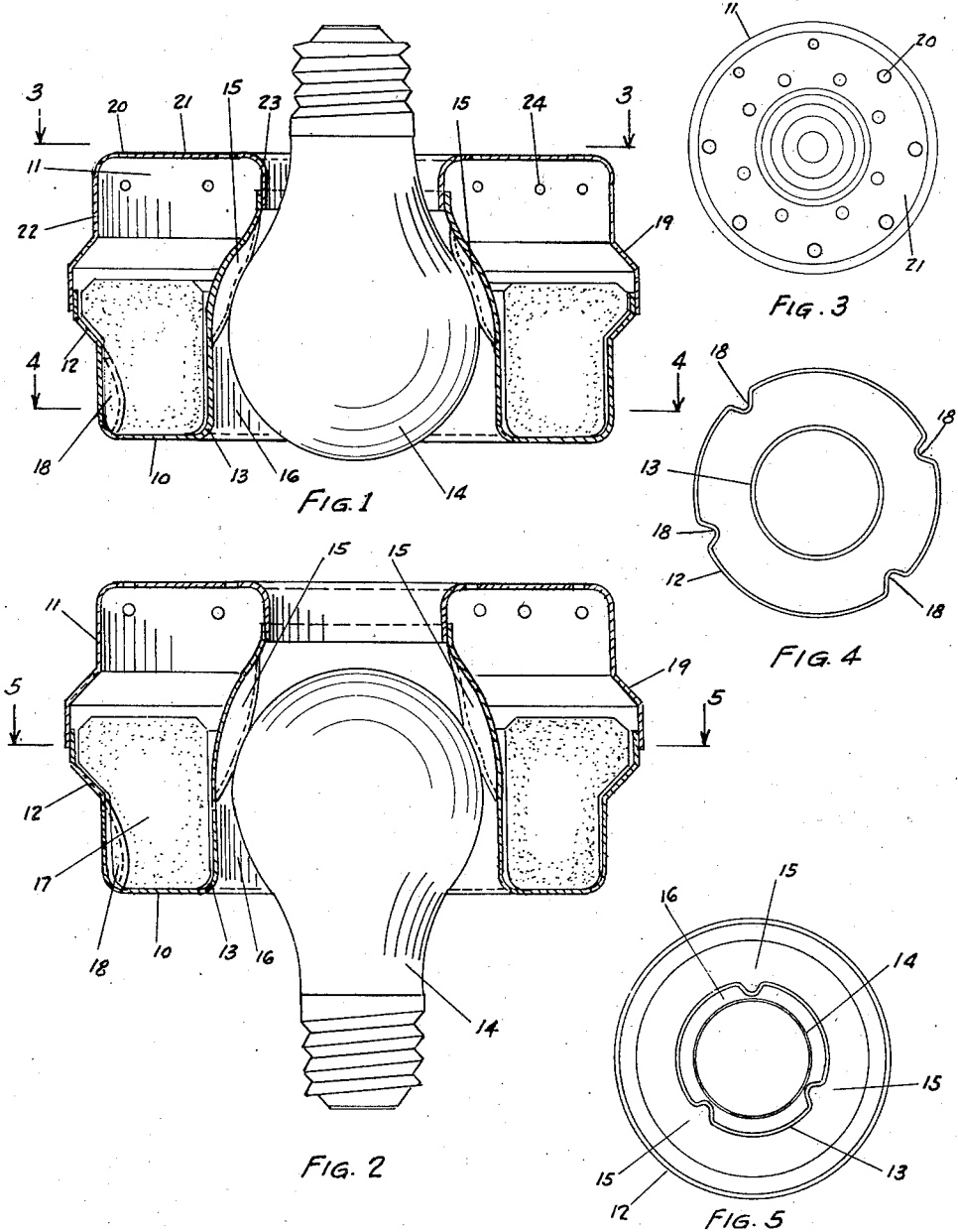

2,435,756

UNITED STATES PATENT OFFICE 2,435,756

VAPORIZING AND DISSEMINATING DEVICE

Harry Schlesinger, Des Moines, Iowa

Application July 7, 1945, Serial No. 603,674

3 Claims. (Cl. 21—120)

The present invention relates to a vaporizing and disseminating device for material that is normally a solid or liquid but with a slight increase in temperature turns to a vapor or gas. The invention more particularly relates to employing this principle for fumigating a closed space, distributing perfume, incense or insecticides around a room, and most important, to distributing a moth-repellent or moth-killer in a closed space.

Materials or substances that under normal conditions are either a liquid or a solid have been placed within a vaporizing device and vaporized by the heat from an ordinary electric light bulb. The vapor or gas, usually lighter than air, rises and is distributed around a room or a closed space, such as a closet. In the devices heretofore known for this purpose, the device has been supported directly on a light bulb. The heat from the light bulb passes to the device by conduction, then to the material to be vaporized and the device concentrates the heat around the light bulb and does not allow it to be dissipated. An electric light bulb is constructed in such a manner that the heat from the heated filaments must be dissipated or the bulb becomes too hot with a breaking of the filament or of the glass resulting.

It is an object of the invention, among others, to provide an improved vaporizing and disseminating device for a volatile material which is placed on a source of heat; a vaporizing and disseminating device that is spaced slightly from the source of heat, such as an electric lamp bulb, so that sufficient heat will be furnished the device to render the substance therein volatile, but that sufficient heat will be dissipated from the lamp bulb to insure that the lamp bulb will not be harmed; a vaporizing and disseminating device spaced from the source of heat, such as a lamp bulb, which space provides a circulation of air therethrough to aid in circulating the volatile substance throughout a closed space; a volatile material in the form of a solid cake made in a particular shape to fit entirely within the vaporizing and disseminating device so that when heat is applied and the material liquifies, the liquid will not run down over the lamp bulb and from there to a floor; a vaporizing and disseminating device having a top portion thereof constructed in such a manner as to provide for maximum distribution and circulation through a closed space; a vaporizing and disseminating device of light-weight, low cost, portable and compact, simple to assemble and operate, economical in operation, simple of design and durable. Other objects will become apparent from a detailed description to follow in conjunction with the drawing.

In carrying out the objects of the invention there is provided a vaporizing and disseminating device for a volatile material comprising an annular trough member receiving a material to be vaporized with the annular trough having an outer substantially circular wall and an inner wall concentric with the outer wall, with the device being supported on a source of heat which vaporizes the volatile material, the inner wall having means which spaces the annular trough member from the source of heat with a space between the two members being formed thereby, when the two members are assembled in operative position and an apertured cover for the trough member through which the vapors escape. The means on the inner wall of the trough member to space the trough member from the source of heat may be a series of rib members and further they may be pressed from the material of the inner wall.

The material to be vaporized may be in the form of a cake and made in the shape of the annular trough member. The outer wall of the trough member has means to space and locate or position the cake to be vaporized within the trough. This spacing and locating means may be in the form of a rib means on the outer wall of the trough member and further the ribs may be pressed out of the outer wall. The cover for the trough member through which the vapors escape has a top portion along with an outer substantially circular wall and an inner wall concentric with the outer wall, with both wall portions connecting into the top portion and apertures are located in both the top portion and the outer wall through which the vapors escape.

With the foregoing and other objects in view, the invention will be more fully described hereinafter and will be particularly pointed out in the claims appended hereto.

In the drawings, wherein like symbols refer to like or corresponding parts throughout the several views:

Figure 1 is a vertical sectional view of the vaporizing and disseminating device showing the trough with the cover member in place supported from a light bulb hanging vertically downward.

Figure 2 is a vertical sectional view of the vaporizing and disseminating device showing the trough with the cover member in place supported from a light bulb in an upright position.

Figure 3 is a sectional view taken on the line 3—3 of Figure 1, looking in the direction of the arrows.

Figure 4 is a sectional view taken on the line 4—4 of Figure 1, looking in the direction of the arrows.

Figure 5 is a sectional view taken on the line 5—5, Figure 2, looking in the direction of the arrows.

The vaporizing and disseminating device comprises a trough member 10 with a cover member 11 assembled thereon as shown in both Figures 1 and 2. The trough member 10 has an outer substantially circular wall 12 and an inner wall 13 concentric with the outer wall 12. The inner wall 13 is made of a greater length than the outer wall 12 and the ends of both wall portions 12 and 13 present receiving portions for the cover member 11 to provide a slip joint between the two members when in assembled relation.

The trough member 10 has spacing means on the inner wall 13 to space the assembled vaporizing and disseminating means from a source of heat, which may be a light bulb 14, hanging vertically downward as in Figure 1 and the bulb 14 in an upright position as in Figure 2. To illustrate a spacing means, the drawings show rib means 15 pushed or pressed out of the inner wall 13. Both the trough member and cover are made of sheet material of lightweight and in practice aluminum has been found very desirable, but other light metals may be used just as effectively. Figure 5 shows the rib members to be three in number, but it is to be understood this is just illustrative and any number of ribs may be employed without departing from the invention. Referring both to Figures 1 and 2, it is seen that when the vaporizing and disseminating device is mounted on the light bulb 14, a space 16 is left between the device and light bulb by the ribs seating on the light bulb.

In operation, the vaporizing and disseminating device is placed on the light bulb 14, being previously loaded with a volatile material. Heat from the light bulb passes by convection through the air in space 16 to the metal of the device and then by conduction through the metal, and then passes to the volatile material. If the device sits directly on the light bulb, so as to have a substantial portion of the metal in contact with the bulb, it has been found that the heat in passing through the device will not be dissipated fast enough and the filaments of the bulb will break due to excessive heating or the glass of the bulb will crack and break. Then too, in numerous cases it has been found that when the device rests in contact with the bulb there is too much heat concentrated on the device so as to volatilize the substance within the device too rapidly. The space 16 is filled with air which air becomes heated from the light bulb. The air thus heated rises, and passes upwardly through the space 16. As can be seen, space 16 is not a straight through path, but is tortuous, hence the flow of the heated air is not streamline. The air contacts ribs 15, transferring some of its heat to the ribs; also the inner wall 13 along its entire length. A 15 watt bulb has been used with excellent results in disseminating a moth-repellent or moth-killer in a closed space, but it is noted that any size bulb may be used depending upon the heat desired to volatilize a material within a particular time, but the 15 watt bulb is only suggestive when a moth-repellent or moth killer is employed as the volatile material.

Within the trough member 10 is a cake 17 of volatile material, made in the shape of the trough member 10, with the cake not extending much above the outer wall 12 in height. The cake 17 may be made from paradichlorbenzine crystals if a moth killer or moth repellent is to be employed. When the device is assembled with a cake of paradichlorbenzine therein and placed over a lighted bulb, the solid cake turns to liquid first and with continued heat, passes off as a vapor. Therefore it is important that the device be level when placed on the light bulb or the liquid will run out of the device, over the bulb and onto the floor. The liquid will be cooler than the bulb and the bulb will be broken. It is just as important that the trough not be filled with a cake larger than the trough member 10, so that more liquid than the trough 10 will hold results when heat is applied. The outer wall 12 has means 18 for spacing and locating the cake of material within the trough member. As shown in Figure 3, the means may be rib members and can be pressed from the outer wall 12 and may be any number of ribs, spaced in any manner. In Figure 4 as an example, four ribs are shown irregularly spaced. The cover member has a shoulder means 19, which shoulder means is spaced to contact a cake of material if it extends upwardly too far in the trough member. It can therefore be seen that the outer wall 12 of the trough member has ribs 18 irregularly spaced so only a cake of material having recesses corresponding to the ribs will fit into the trough. If a cake of material is placed into the trough which does not fit the trough, it will extend upwardly too far, contact shoulder 19 on the cover and thus prevent assembly of the cover on the trough. This will insure that the material which turns to liquid will not inadvertently run over the bulb and floor, as the device can only be properly assembled when a cake of material having proper recesses is seated within the trough.

The cover member 11 has a series of openings 20 in a top portion 21 which top portion 21 has an outer substantially circular wall 22 connected thereto and an inner wall 23 concentric with the outer wall also connected to the top portion 21. In the outer wall 22 are a series of openings 24 which openings 24 along with the openings 20 serve as outlets for the vapor leaving the device. With this arrangement of openings for the cover 11 a better distribution of vapors is had in a closed space. The inner and outer wall portions of the cover 11 slip into or over their corresponding parts on the trough member to form a relatively tight fit between the two members when they are assembled.

This device is placed in a closed space such as a closet, room or any enclosure where it is desired to fumigate, de-odorize, demoth. It is essential that the vapor be circulated around the entire closed space and that the space be saturated with the vapor to the concentration needed to accomplish the particular job or purpose desired. In demothing, a strong concentration is not material, but it is essential that the vapor be in contact and pass through articles to be demothed for no less than six hours. Regardless of how well a closed space is sealed, there is always leakage of air into the room, thus diluting the concentration of the volatile material. The volatile material must be continually generated and be circulated to the closed space to compensate for leakage of air into the closed space. Applicant's device presents a novel means of circulating the volatile material through a closed space. The openings 24 discharge the vapor outwardly in a plane parallel to both the floor and ceiling for a short distance before the vapor starts to rise toward the ceiling. The vapor discharged through the openings 20 rises toward the ceiling and the hot air rising in the space 16 is moving upwardly and draws the vapor upwardly with it, toward the ceiling. The hot air flowing through space 16 and being directed as it is, keeps up a steady circulation throughout the closed space which directs the vapor to every nook and corner of the closed space more efficiently than any devices heretofore known.

It is noted that the trough member 10 can be filled with powder or crystals and the device will function with equal efficiency. The cake possesses the advantage that it can be made in just about the quantity necessary for a treatment without any refilling of the device and the heat transfer to the cake is better since it contacts both the outer wall and the inner wall of the trough member.

While the invention has been described in connection with several specific embodiments, it is to be understood that the words which have been used are words of description rather than of limitation, and that practice of the invention within the scope of the appended claims may be resorted to without departing from the true scope of the invention in all its aspects.

I claim:

1. A vaporizing and disseminating device for a volatile material comprising an annular trough for receiving a material to be vaporized, said annular trough member having an outer substantially circular wall and an inner wall substantially concentric with the outer wall at its lower part, spaced rib means on the inner wall of the trough member to support the trough member on a source of heat and allow a space between the trough member and the source of heat when the trough member is in operative position, a cover member having an outer substantially circular wall and an inner substantially circular wall fitting over the walls of the trough to hold the device assembled and said cover member having apertures to allow the volatilized material to escape to the atmosphere.

2. A vaporizing and disseminating device for a volatile material comprising an annular trough member for receiving a material to be vaporized, said annular trough member having an outer substantially circular wall and an inner wall substantially concentric with the outer wall at its lower part with said inner wall curving inwardly and extending upwardly substantially beyond the top of the outer wall, spaced rib means on the inner wall of the trough member to support the trough member on a source of heat and allow a space between the trough member and the source of heat when the trough member is in operative position, a cover member having an outer substantially circular wall and an inner substantially circular wall, said walls fitting over the walls of the trough member to hold the device assembled and said cover member being apertured to allow the volatilized material to escape to the atmosphere.

3. A vaporizing and disseminating device for a volatile material comprising an annular trough member for receiving a material to be vaporized, said annular trough member having an outer substantially circular wall and an inner wall substantially concentric with the outer wall at its lower part, said inner wall curving inwardly and extending upwardly above the top of the outer wall, spaced ribs on the curved portion of the inner wall of the trough member to support the trough member on a source of heat and allow a space between the trough member and the source of heat when the trough member is in operative position, a cover member having an outer substantially circular wall and an inner substantially circular wall, said walls fitting over the walls of the trough member to hold the device assembled and said cover member being apertured to allow the volatilized material to escape to the atmosphere.

HARRY SCHLESINGER.

REFERENCES CITED

The following references are of record in the file of this patent:

UNITED STATES PATENTS

| Number | Name | Date |
|---|---|---|
| 1,556,680 | Dorment | Oct. 13, 1925 |
| 1,706,939 | Rosenthal | Mar. 26, 1929 |

FOREIGN PATENTS

| Number | Country | Date |
|---|---|---|
| 605,951 | France | Feb. 27, 1926 |
| 726,968 | France | Mar. 15, 1932 |